(12) United States Patent
Lumsden et al.

(10) Patent No.: US 8,133,288 B2
(45) Date of Patent: Mar. 13, 2012

(54) AQUEOUS BOROHYDRIDE COMPOSITIONS

(75) Inventors: Charles Arthur Lumsden, Greensboro, GA (US); Thomas Hugh Evans, Barto, PA (US)

(73) Assignee: Montgomery Chemicals, LLC, Conshohocken, PA (US)

( * ) Notice: Subject to any disclaimer, the term of this patent is extended or adjusted under 35 U.S.C. 154(b) by 185 days.

(21) Appl. No.: 12/428,812

(22) Filed: Apr. 23, 2009

(65) Prior Publication Data
US 2009/0199461 A1    Aug. 13, 2009

Related U.S. Application Data

(62) Division of application No. 11/076,708, filed on Mar. 10, 2005, now abandoned, which is a division of application No. 10/293,642, filed on Nov. 13, 2002, now Pat. No. 6,866,689.

(60) Provisional application No. 60/337,878, filed on Nov. 13, 2001.

(51) Int. Cl.
*C10L 1/10* (2006.01)
*C10L 1/12* (2006.01)

(52) U.S. Cl. ............................. 44/300; 423/276; 423/286

(58) Field of Classification Search .................. 423/276, 423/286; 210/634, 511
See application file for complete search history.

(56) References Cited

U.S. PATENT DOCUMENTS

| | | | |
|---|---|---|---|
| 1,711,499 A | 5/1929 | Hossass | |
| 2,615,788 A | 10/1952 | Gibb et al. | |
| 2,942,934 A | 6/1960 | Wade et al. | |
| 2,970,114 A | 1/1961 | Bragdon | |
| 3,795,491 A | 3/1974 | Winiarczyk | |
| 3,933,676 A | 1/1976 | Wade | |
| 4,883,595 A * | 11/1989 | Seppanen | ..................... 210/634 |
| 5,094,833 A | 3/1992 | Ko et al. | |
| 5,360,551 A | 11/1994 | Weber | |
| 5,804,329 A | 9/1998 | Amendola | |
| 5,948,558 A | 9/1999 | Amendola | |
| 6,217,621 B1 | 4/2001 | Modebelu et al. | |
| 6,231,825 B1 | 5/2001 | Colby et al. | |
| 6,250,078 B1 | 6/2001 | Amendola | |
| 6,534,033 B1 | 3/2003 | Amendola et al. | |
| 2001/0022960 A1 | 9/2001 | Kojima | |
| 2002/0083643 A1 | 7/2002 | Amendola | |
| 2003/0014917 A1 | 1/2003 | Rusta-Sallehy | |
| 2003/0228505 A1 | 12/2003 | Tsang | |

* cited by examiner

*Primary Examiner* — Cephia D Toomer
(74) *Attorney, Agent, or Firm* — Paul & Paul

(57) ABSTRACT

An aqueous fuel for generating hydrogen includes alkaline aqueous composition of about 17 to 37 mole percent of a sodium borohydride, and from about 0.001 to 1 mole percent of sodium hydroxide.

4 Claims, 1 Drawing Sheet

AQUEOUS BOROHYDRIDE COMPOSITIONS

CROSS-REFERENCE TO RELATED APPLICATION

This application is a division of U.S. patent application Ser. No. 11/076,708, filed Mar. 10, 2005, now abandoned, which is a division of U.S. patent application Ser. No. 10/293,642, filed Nov. 13, 2002, now U.S. Pat. No. 6,866,689 issued on Mar. 15, 2005; which claims priority of U.S. Provisional Patent Application Ser. No. 60/337,878, filed Nov. 13, 2001, now expired.

BACKGROUND OF THE INVENTION

1. Field of the Invention

The present invention relates to aqueous borohydride compositions, and its use as a hydrogen-based fuel, processes for converting such fuel into energy, and its use in purification of organic compounds, recovery of heavy and precious metals and de-colorization of wastewater streams, synthesis of pharmaceutical compounds, and the generation of sodium hydrosulfite in paper, leather and textile manufacture.

2. Brief Description of the Related Art

Fuel cells are known as a source of energy. Various types of fuel cells are known, including proton exchange membrane, molten carbonate, alkaline, phosphoric acid, and solid oxide. While technologies such as direct methanol processes have been investigated, such cells frequently employ hydrogen gas as a source of chemical energy, and convert that chemical energy into electricity for use in powering electric motor-driven vehicles and the like. The hydrogen gas may be obtained from water by electrolysis at a production facility, stored, and then transferred as a fuel to vehicles, and stored, for example, under high pressure in a suitable tank. This process has the obvious potential disadvantage of having to store quantities of hydrogen, a highly flammable material. Alternatively, the hydrogen gas can be generated in situ from another material. For example, hydrogen gas can be generated from natural gas using an on-board reformer, or from common gasoline using an autothermal reformer that extracts hydrogen from gasoline in a series of chemical conversion steps. In addition to organic compounds such as gasoline, another possible source of hydrogen are inorganic hydrogen compounds, such as metal hydrides. One example is sodium borohydride $NaBH_4$. As an aqueous solution in a fuel cell, sodium borohydride reacts with water to liberate hydrogen in the presence of a suitable catalyst:

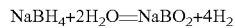

$$NaBH_4 + 2H_2O = NaBO_2 + 4H_2$$

In conventional practice, an aqueous solution containing about 20% sodium borohydride and about 5% caustic soda in water is used as a propellant. This fuel is stable for a reasonable period of time; however, the high concentration of caustic in the conventional formulation shortens the effective life of the ruthenium catalyst, and creates environmental problems associated with the disposal or recycle of the spent sodium borohydride fuel formulation. In addition, the high pH fuel may adversely affect catalysts employed in decomposing the sodium borohydride to provide hydrogen or for the reaction of hydrogen with a suitable oxidant. It is clear, therefore, that the industry needs a safer, more efficient and more environmentally friendly propellant than the one offered by the conventional formulation. Thus, while fuel cell-related technology has rapidly progressed recently, there is a continuing need for stable, high quality fuels for use in such cells.

Sodium dithionite, also known as sodium hydrosulfite, is spontaneously ignitable and hence considered a hazardous material to transport. Nevertheless, sodium hydrosulfite is used in large quantities in the papermaking and textile industries. To avoid transporting sodium hydrosulfite, in recent years in situ preparation of sodium hydrosulfite from the reaction of sodium borohydride, sodium hydroxide solution and sodium bisulfite has been employed. Sodium borohydride is thus widely employed in the papermaking and textile industries to prepare sodium hydrosulfite, such as disclosed, for example, in U.S. Pat. No. 5,094,833, herein incorporated by reference. However, solid sodium borohydride is itself a pyrophoric material, which militates against its use in industrial processes. On the other hand, conventional aqueous solutions of sodium borohydride are not pyrophoric, but tend to have very limited stability unless stabilized with a caustic material. The water of solution disadvantageously increases the cost of shipping borohydride, while the caustic employed for stabilization requires additional steps for post-treatment disposal. Thus, there is a need for a stable, low alkaline liquid form of sodium borohydride in many conventional applications where sodium borohydride is used today including recovery of heavy and precious metals, purification of organic alcohols and amines, synthesis of pharmaceutical compounds, and the generation of sodium hydrosulfite for the textile, leather and paper industries.

SUMMARY OF THE INVENTION

It is an object of this invention to provide a stable, more efficient fuel formulation that is consistently higher in alkali metal borohydride concentration than the conventional formulation presently used. It is a further object of this invention to provide a fuel formulation that minimizes the use of caustic soda to stabilize the alkali metal borohydride present in the aqueous formulation therefore increasing efficiency of the catalyst and presenting no environmental disposal problems for the spent fuel. Another object of the present invention is to provide a stable, high concentration solution or slurry of alkali metal borohydride. Another object of the present invention is to provide a high concentration solution or slurry of alkali metal borohydride that can be used in existing commercial applications for sodium borohydride including but not exclusive to the recovery of heavy and precious metals, dye wastewater de-colorization, purification of organic compounds such as alcohols and amines, the production of hydrosulfite, for use in papermaking, leather and/or textile processing, and processes employing such solutions and slurries. These objectives are realized by an alkaline aqueous solution according to the present invention.

The present invention provides an aqueous solution and fuel for use in fuel cells, internal combustion engines and batteries, and a process for using that aqueous fuel, such as for transportation and power generation. More particularly, the present invention provides an aqueous composition comprising a combination of a high concentration of alkali metal borohydride, preferably sodium borohydride, and a low level of caustic soda. The present invention provides a stable, low alkaline solution that is more effective, safer and environmentally preferable to conventional formulations containing lower borohydride concentrations that must be stabilized with high caustic concentrations for stability. The present invention provides an alkaline aqueous composition for propelling fuel cells, internal and external combustion engines, batteries, and for traditional commercial applications where sodium borohydride is used such as recovery of heavy and precious metals, wastewater de-colorization, purification of organic compounds, synthesis of pharmaceuticals and the production of sodium hydrosulfite, the aqueous composition being comprised of alkali metal borohydride, preferably sodium borohydride, caustic and water, which is high in borohydride concentration, and low in caustic concentration.

Surprisingly, weakly alkaline, highly concentrated solutions of sodium borohydride exhibit an acceptable level of stability for use as an aqueous fuel. The alkaline aqueous compositions of the present invention are extremely stable under both aerobic and anaerobic conditions, and use of such fuels generate no significant by-products that must be disposed of as hazardous waste.

Preferably, the aqueous composition of the present invention comprises an alkaline aqueous solution or slurry comprising from about 17 to 37 mole percent of sodium borohydride, and from about 0.001 to 1 mole percent of a strong base. More preferably, the aqueous composition of the present invention comprises an alkaline aqueous solution or slurry comprising from about 24 to 30 mole percent of sodium borohydride, and from about 0.025 to 0.3 mole percent of a strong base, such as caustic soda. It is especially preferred that the aqueous composition of the present invention comprise about 44.0 percent by weight sodium borohydride, about 0.2 percent by weight caustic soda and about 55.8 by weight water by weight. In terms of mole percent, the concentrated alkaline aqueous solution preferably comprises about 27.27 mole percent sodium borohydride, about 0.12 mole percent sodium hydroxide, and about 72.61 mole percent water, the mole ratio of sodium hydroxide to sodium borohydride being about 0.0043.

Preferably, the aqueous composition of the present invention comprises an aqueous slurry having a temperature of from about 10 to about 30 degrees C.

The present invention also provides a process for preparing an aqueous solution of sodium hydrosulfite. The process for preparing the aqueous solution of sodium hydrosulfite comprises providing a first component comprising an aqueous composition comprising sodium borohydride and sodium hydroxide, a second component comprising sodium bisulfite, a third optional component comprising sulfuric acid, and mixing the components. Alternatively, caustic and sulfur dioxide can be substituted for the sodium bisulfite component. The aqueous composition comprises from about 17 to 37 mole percent of an alkali metal borohydride, and from about 0.001 to 1 mole percent of sodium hydroxide, and more preferably, from about 24 to 30 mole percent of sodium borohydride, and from about 0.025 to 0.3 mole percent of sodium hydroxide.

DETAILED DESCRIPTION

The alkaline aqueous compositions of the present invention are fluid compositions, taking the form of aqueous slurries or aqueous solutions. The alkaline aqueous compositions of the present invention comprise an alkali metal borohydride, preferably selected from the group consisting of lithium borohydride, sodium borohydride, and potassium borohydride. Sodium borohydride is especially preferred.

The alkaline aqueous compositions of the present invention are extremely stable under aerobic and anaerobic conditions, and contain a low level of alkaline by-products or stabilizing agents, which may otherwise be considered as hazardous waste.

The alkaline aqueous compositions of the present invention can be prepared in a conventional manner. For example, the sodium borohydride solid material can be dissolved in the prescribed caustic and water to produce the fuel.

Alternatively, the composition can be produced by concentrating aqueous sodium borohydride solutions followed by the addition of caustic soda and water. For example, a 12% by weight alkaline aqueous solution of sodium borohydride and caustic is concentrated by batch mixing the 12% w/w product with isopropylamine in a continuous flow solvent extraction column to separate sodium borohydride from caustic and water to make a 6.0% sodium borohydride solution in isopropylamine. Suitable amounts of DI water and the 12% w/w aqueous alkaline solution of sodium borohydride and caustic are then added back to the sodium borohydride/isopropylamine to provide a concentrated alkaline solution of sodium borohydride in a mixed solvent of water and isopropylamine. Finally, the sodium borohydride solution is concentrated by evaporating the isopropylamine by conventional means.

Figure 1:
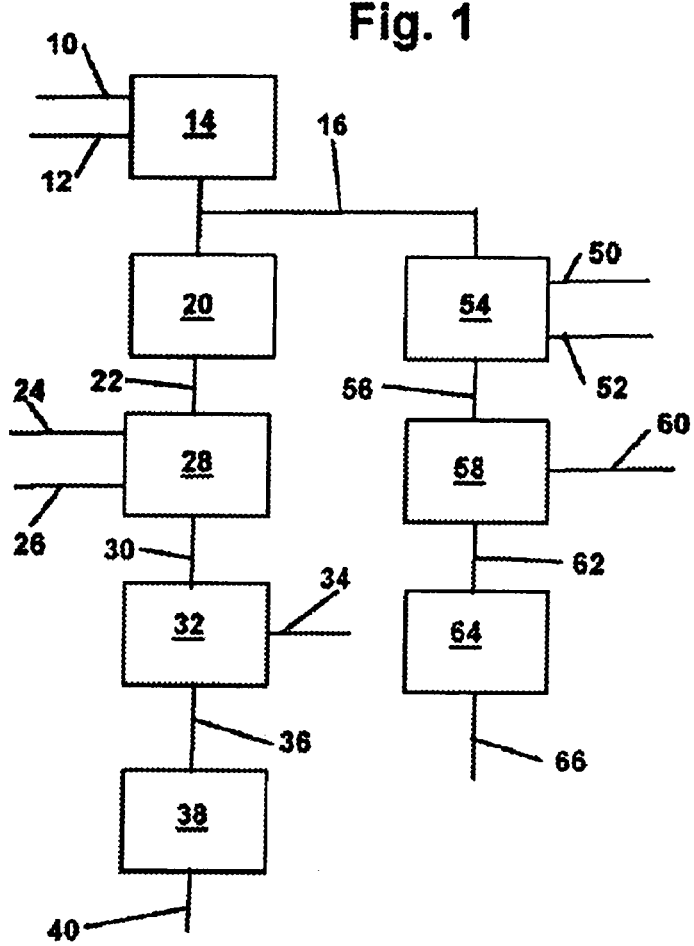
FIG. 1 is a process flow diagram schematically showing processes for the preparation of aqueous alkaline compositions according the present invention.
Figure 2:
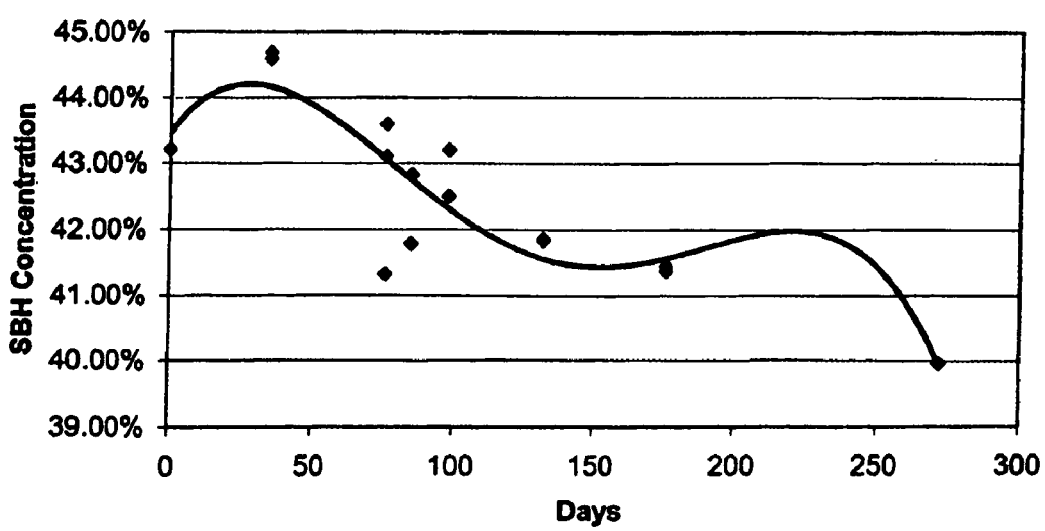
FIG. 2 is graphical representation showing the stability of a composition according to the present invention.

The alkaline aqueous compositions of the present invention can be prepared by the process of the present invention, such as schematically shown in the process flow diagram of FIG. 1. In the process of the present invention, a feedstock of a dilute alkaline aqueous solution of sodium borohydride 10, such as an aqueous solution comprising from about 6% w/w to about 20% w/w sodium borohydride, is concentrated by mixing the dilute alkaline solution of sodium borohydride 10 with a polar, non-aqueous solvent 12, such as isopropylamine, that is a good solvent for the sodium borohydride but a poor solvent, or non-solvent for the base, in a mixing device 12 in order to extract sodium borohydride from the alkaline aqueous solution into the non-aqueous phase 16, leaving a sodium hydroxide-containing aqueous phase. The non-aqueous phase 16 comprising an initial non-aqueous solution of sodium borohydride is then separated from the aqueous phase. The initial non-aqueous solution of sodium borohydride can then be concentrated to provide a predefined concentration of sodium borohydride by evaporating the non-aqueous solvent, such as by a vacuum evaporative technique or step, in a suitable evaporating device 20. Predefined amounts of water 24 and an alkaline stabilizing agent 26, such as sodium hydroxide, can then be added to the concentrated non-aqueous solution of sodium borohydride 22 in a mixing device 28. Preferably, the alkaline stabilizing agent comprises additional feedstock, which is relatively enriched in sodium hydroxide. The resulting mixture 30 can then be transferred to suitable evaporation device 32, and the remaining non-aqueous solvent can be removed, to provide the concentrated product 34. The gaseous stream of non-aqueous solvent 36 is condensed in a suitable condenser 38 to provide liquid non-aqueous solvent 40 that can be recycled in the process. Alternatively, predefined amounts of water 50, such as distilled (DI) water and an alkaline stabilizing agent 52, preferably comprising the feedstock, can be mixed in a suitable mixing device 54 with the initial non-aqueous solution of sodium borohydride 16, and the resulting solution 56 can then be concentrated by evaporating the non-aqueous solvent in a suitable evaporating device 58 to provide an alkaline aqueous composition having predefined concentrations of sodium borohydride and stabilizing agent 60, with the resulting gas-phase non-aqueous solvent 62 being condensed in a suitable condensing device 64 so that the liquid non-aqueous solvent 66 can be recycled.

The present invention provides a process for energizing fuel cells, internal and external combustion engines, and batteries for transportation and energy generation. The process of the present invention comprises providing an alkaline aqueous solution of the present invention as a source of hydrogen to a suitable device for decomposing the sodium borohydride, and using the liberated hydrogen as a source of energy. For example, decomposition of the sodium borohydride can be accomplished chemically, with a suitable catalyst, such as ruthenium, to produce hydrogen that is ignited in either an internal or external combustion engine. In addition, the alkaline aqueous solution can be provided to a fuel or battery in which the decomposition of sodium borohydride can be accomplished at the anode.

Further, the sodium borohydride solution of the present invention can be employed in the reduction of sodium bisulfite to generate sodium hydrosulfite for use in textile processing, leather and papermaking, such as disclosed for example, in U.S. Pat. No. 4,788,041, hereby incorporated herein by reference. Conventionally, a solution of 12% sodium borohydride and 40% sodium hydroxide is used. In the process of the present invention, a first component comprising an aqueous composition comprising sodium borohydride and sodium hydroxide, a second component comprising sodium bisulfite solution, and an optional third component comprising sulfuric acid are provided, and the components are mixed, thus generating the aqueous sodium hydrosulfite. Optionally, a mixture of sulfur dioxide and caustic can be substituted for the sodium bisulfite solution in order to generate the bisulfite in situ. The aqueous borohydride composition used in this process comprises from about 17 to 37 mole percent of an alkali metal borohydride, and from about 0.001 to 1 mole percent of sodium hydroxide, and more preferably, from about 24 to 30 mole percent of sodium borohydride, and from about 0.025 to 0.3 mole percent of sodium hydroxide.

Employing a sodium borohydride solution according to the present invention advantageously reduces transportation costs, since, for example, a 44% solution is almost four times the strength of the traditional formulation making it much less expensive to transport. In addition, in the conventional process the 40% caustic must be neutralized with acid for the sake of efficiency. The 44% solution contains almost no caustic, thus reducing or eliminating the capital and material costs associated with the use of acid.

Because solid sodium borohydride is pyrophoric, the concentrated solution of the present invention advantageously provides a non-pyrophoric concentrated source of sodium borohydride for use in various environmental, organic chemical, pharmaceutical and electronic applications.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

Example 1

Sodium borohydride solution (12% w/w sodium borohydride, 40% w/w sodium hydroxide, and 48% w/w water) and isopropylamine (IPA) are feed into a counter current extraction column in a ratio of approximately two parts by volume of IPA and one part sodium borohydride solution. The sodium borohydride is dissolved into the IPA and flows out the top of the extractor while the sodium hydroxide and water flows out the bottom. The IPA/sodium borohydride solution contains approximately 6% sodium borohydride and only a few tenths of a percent sodium hydroxide. The IPA/sodium borohydride solution is then directed to an evaporator to remove IPA from the solution, and the IPA/sodium borohydride solution is concentrated to a point where the sodium borohydride solution is virtually free of IPA. The concentrated sodium borohydride solution is then sent to a mixing tank. In the mixing tank the concentrated sodium borohydride solution, water and a 12% w/w aqueous sodium borohydride solution are combined to the proper ratio to produce the 44% w/w sodium borohydride, 0.2% w/w sodium hydroxide and 55.8% w/w water. The resulting solution is then optionally processed through a final evaporator to remove residual IPA from the solution.

Example 2

Alkaline aqueous sodium borohydride solutions were prepared in the proportions shown in Table A below using sodium hydroxide as the caustic material. The solutions were stored at the temperature shown in Table A, and the decomposition rate of the sodium borohydride was determined by hydrogen evolution. The resulting decomposition rates are also shown in Table A. The results reported in Table A show that a 44% w/w solution of sodium borohydride is stabilized against decomposition by a surprisingly low level of caustic.

TABLE A

| Aqueous % $NaBH_4$ | Solution % Caustic | Temperature Deg C. | Decomposition Rate % $NaBH_4$/hr. |
|---|---|---|---|
| 12.0 | 40.0 | 25.0 | 0.00 |
| 9.3 | 0.0 | 25.0 | 2.50 |
| 9.3 | 0.5 | 25.0 | 0.30 |
| 44.0 | 0.0 | 40.0 | 0.06 |
| 44.0 | 0.1 | 40.0 | 0.01 |
| 44.0 | 0.2 | 40.0 | 0.00 |
| 47.0 | 0.7 | 50.0 | 0.03 |
| 47.0 | 1.0 | 50.0 | 0.02 |
| 50.0 | 0.3 | 60.0 | 0.17 |
| 50.0 | 0.5 | 60.0 | 0.10 |
| 50.0 | 0.7 | 60.0 | 0.03 |

Example 3

Samples of the 44% sodium borohydride solution prepared according to the process of Example 1 are stored at 25 degrees C. for the periods indicated in Table B. The concentration of sodium borohydride in the sample is determined either by the titration method or by evolution of hydrogen, using a modification of the test procedure of Davis, W. D.; Mason, L. S.; Stegeman, G., J. American Chemical Society 1949, 71, 2775; and the results are reported in Table B and graphed in FIG. 1. The results reported in Table B and displayed in FIG. 1 show that the 44% sodium borohydride solution surprisingly retains about 90 percent of its initial activity, even after almost a year of storage.

TABLE B

| Weight Percent Sodium Borohydride | Method (Titration/Evolution) | Time Elapsed (Days) |
|---|---|---|
| 43.21% | T | 0 |
| 44.60% | T | 35 |

TABLE B-continued

| Weight Percent Sodium Borohydride | Method (Titration/Evolution) | Time Elapsed (Days) |
|---|---|---|
| 44.70% | T | 35 |
| 43.60% | T | 76 |
| 43.10% | T | 76 |
| 41.33% | E | 76 |
| 42.83% | E | 85 |
| 41.79% | E | 85 |
| 42.50% | E | 98 |
| 43.20% | E | 98 |
| 41.86% | E | 132 |
| 41.83% | E | 132 |
| 41.37% | E | 176 |
| 41.45% | E | 176 |
| 39.96% | E | 272 |

Example 4

A 44% w/w sodium borohydride solution is produced by extracting sodium borohydride (SBH) from a commercially available sodium borohydride solution (Boromet 1240, Montgomery Chemical, Conshohocken, Pa.) with an isopropylamine (IPA) and water solution. The extracted SBH in solution is recombined with the appropriate amount of water and Boromet 1240 so that when all the IPA is removed the resulting product is a high concentration sodium borohydride solution ("Borojet 442") of the following make-up:

44% w/w sodium borohydride
0.2% w/w sodium hydroxide
Balance water

Four trials of laboratory scale implementation of this process were conducted as follows:

An IPA extraction solution was prepared by combining IPA and water to yield an 88% w/w IPA solution. This solution was then used to extract SBH from Boromet 1240. The IPA solution was mixed with Boromet 1240 in a separatory funnel in a 2 to 1 volumetric ratio; 2 parts IPA solution per 1 part Boromet 1240. Two phases formed. The heavy phase, a caustic water solution, was drawn off and set aside. The light phase, the extracted SBH in IPA, was collected and analyzed by an iodate titration procedure.

The SBH content in each of the IPA extractions were found to be:

| Trial | % w/w SBH in IPA Extraction Solution |
|---|---|
| A1 | 7.30% w/w |
| B1 | 6.44% w/w |
| C1 | 9.30% w/w |
| D1 | 6.89% w/w |

Using the analysis, and weight of each sample, the mass of SBH present in each sample was calculated. Sample calculations from Trial D1 are as follows:

(Sample weight)×(% w/w SBH)=mass SBH (70.245 g)×(6.89%)=4.84 g SBH

The amount of water and Boromet 1240 needed, to yield the desired Borojet 442 composition, is calculated as follows:

(4.84 g SBH)/(44% SBH)=11.0 g Borojet 442

(11.0 g Borojet 442)(0.2% w/w NaOH)=0.022 g NaOH (0.022 g NaOH)/(40% w/w NaOH)=0.055 g Boromet 1240

Thus, 0.055 g of Boromet 1240 are to be added to the extracted SBH in IPA solution to provide the necessary NaOH content. Note: because SBH and water are also present in Boromet 1240, their contribution to the final product must to be considered when carrying out the process on a larger scale. However, because small quantities were employed in these trials, SBH and water contributions due to the Boromet 1240 can be considered negligible, as it is shown here:

(0.055 g Boromet 1240)×(12% w/w SBH)=0.007 g SBH

The amount of water required is calculated to be:

11.0 g Borojet 442−4.84 g SBH−0.055 g Boromet 1240=6.105 g water

The extracted SBH in IPA, Boromet 1240 and water are combined and reanalyzed for SBH content, again by iodate titration. The results were as follows:

| Trial | % w/w SBH in IPA after recombination |
|---|---|
| A1 | 6.87% w/w |
| B1 | 6.32% w/w |
| C1 | 6.64% w/w |
| D1 | 6.48% w/w |

Each sample was then placed in a simple distillation apparatus to remove the IPA and any excess water. This could be accomplished by various methods, but for the purpose of these experiments the simple distillation method was used. The samples were placed under vacuum and heated.

Trials A2 and B2 were performed at 15 in Hg vacuum. The samples were placed under heat and the IPA was removed and collected by condensing the vapor. Because the actual weight of the desired product is known, the samples would be periodically removed from the apparatus and weighed, in the same boiling flask of known weight until enough IPA and excess water had been removed. When it was believed that the IPA and excess water was removed, based on the sample weight, the product was analyzed for SBH concentration by iodate titration. The results were as follows:

| Trial | % w/w SBH in Concentrate |
|---|---|
| A2 | 40.7% w/w |
| B2 | 39.7% w/w |

Having a better understanding of how the IPA removing step physically occurs, Trials C2 and D2 were performed. Trials C2 and D2 were initiated under moderate vacuum to prevent extreme flashing of the IPA. Temperature and amount of vacuum were recorded over time and as the temperature increased the amount of vacuum was increased to prevent operating at elevated temperatures. The following is data recorded from Trial C2:

| Time | Temp. (C.) | Vacuum (in Hg) |
|---|---|---|
| 8:30 | 23 | 17 |
| 8:36 | 26 | 17 |
| 8:38 | 28 | 15 |
| 8:51 | 36.5 | 15 |
| 9:03 | 42 | 15 |
| 9:13 | 50 | 15 |
| 9:23 | 85 | 15 |
| 9:32 | 96 | 15 |
| 9:45 | 99 | 15 |
| 9:47 | 81 | 25 |
| 10:06 | 90 | 25 |

At time 10:06 a sample was analyzed by iodate titration and found to be 32.95% w/w SBH. However, this analysis was believed to be inaccurate for two reasons. First when the sample was weighed it was found that an additional 1.1 g of water was removed from the sample and second, the sample was in crystalline form. At 90° C. a Borojet 442 solution should be in liquid form. Both of these observations indicate that the sample should be over-concentrated and have a SBH concentration greater than 44% w/w.

The analysis was then repeated by hydrogen evolution and the SBH concentration was found to be 46.4% w/w. It is believed that the iodate method, as the procedure is presently performed and which was originally developed to analyze Boromet 1240, is unable to accurately detect the high level of SBH in Borojet 442.

A Borojet 442 sample has approximately 3.7 times as much SBH per unit of mass as does a Boromet 1240 sample. The iodate procedure remains a viable method of analysis for lower concentrations of sodium borohydride; another method should be used for higher concentrations. Thus, although Trial A2 and Trial B2 yielded SBH concentrations of 40.7 and 39.7% w/w in the final product using the iodate method, it is now believed these analyses cannot be considered accurate because the iodate analysis procedure was employed.

Trial D2 was then performed following the same procedure but knowing that the proper concentration will be achieved at 25 in Hg of vacuum and at a temperature less than 90° C. The data for Trial D2 are follows:

| Time | Temp. (C.) | Vacuum (in Hg.) |
|---|---|---|
| 1:44 | 23 | 16 |
| 1:51 | 29 | 16 |
| 1:57 | 34 | 16 |
| 2:05 | 41 | 18 |
| 2:11 | 51 | 18 |
| 2:16 | 73 | 21 |
| 2:19 | 89 | 21 |
| 2:21 | 84 | 23 |
| 2:26 | 80 | 25 |
| 2:30 | 84 | 25 |
| 2:34 | 86 | 25 |

At time 2:34 the sample was removed, weighed and analyzed. The sample weight suggests that the concentration of SBH should be slightly higher than 44% w/w. The SBH concentration was found to be 44.5% w/w by hydrogen evolution. A calculation to determine mass of SBH shows that 4.80 g of SBH is present in the sample. When compared to the amount of SBH to start it is found that 0.8% of the SBH appears lost in the process:

$$[(4.84-4.80)14.84] \times 100\% = 0.83\%$$

Various modifications can be made in the details of the various embodiments of the processes, compositions and articles of the present invention, all within the scope and spirit of the invention and defined by the appended claims.

We claim:

1. A process for preparing an alkaline aqueous borohydride composition, the process comprising:
    mixing a feedstock of a dilute alkaline aqueous solution of sodium borohydride with a polar, non-aqueous solvent that is a better solvent for the sodium borohydride than for the base;
    extracting sodium borohydride from the alkaline aqueous solution into the non-aqueous phase;
    separating the non-aqueous solution of sodium borohydride from the aqueous phase;
    concentrating the initial non-aqueous solution of sodium borohydride to provide a predefined concentration of sodium borohydride by evaporating the non-aqueous solvent;
    adding a predefined amount of an alkaline stabilizing agent to the concentrated non-aqueous solution of sodium borohydride to provide a product, the product including residual non-aqueous solvent; and
    separating the residual non-aqueous solvent from the product to provide a concentrated product.

2. A process according to claim 1 wherein the alkaline stabilizing agent comprises additional feedstock.

3. The process of claim 1 further comprising removing the remaining non-aqueous solvent by an evaporation device.

4. A process according to claim 1 wherein the alkaline stabilizing agent consists of additional feedstock.

* * * * *

UNITED STATES PATENT AND TRADEMARK OFFICE
CERTIFICATE OF CORRECTION

| | | |
|---|---|---|
| PATENT NO. | : 8,133,288 B2 | Page 1 of 1 |
| APPLICATION NO. | : 12/428812 | |
| DATED | : March 13, 2012 | |
| INVENTOR(S) | : Charles Arthur Lumsden and Thomas Hugh Evans | |

It is certified that error appears in the above-identified patent and that said Letters Patent is hereby corrected as shown below:

Column 3, line 11, reads "fuels generate no significant by-products that must be dis-"
    should read -- fuels generates no significant by-products that must be dis- --

Column 3, line 25, reads "percent by weight caustic soda and about 55.8 by weight"
    should read -- percent by weight caustic soda and about 55.8 percent by weight --

Column 3, line 26, reads "water by weight. In terms of mole percent, the concentrated"
    should read -- water. In terms of mole percent, the concentrated --

Column 3, line 55, reads "tions according the present invention."
    should read -- tions according to the present invention. --

Column 5, line 64, reads "isopropylamine (IPA) are feed into a counter current extrac-"
    should read -- isopropylamine (IPA) are fed into a counter current extrac- --

Column 6, line 1, reads "the extractor while the sodium hydroxide and water flows out"
    should read -- the extractor while the sodium hydroxide and water flow out --

Column 8, line 7, reads "Boromet 1240, their contribution to the final product must to"
    should read -- Boromet 1240, their contribution to the final product must --

Column 8, line 11, reads "can be considered negligible, as it is shown here:"
    should read -- can be considered negligible, as is shown here: --

Column 10, line 9, reads "that the sample should be over-concentrated and have a SBH"
    should read -- that the sample should be over-concentrated and have an SBH --

Signed and Sealed this
First Day of May, 2012

David J. Kappos
*Director of the United States Patent and Trademark Office*